US010413816B2

(12) United States Patent
Moir et al.

(10) Patent No.: US 10,413,816 B2
(45) Date of Patent: Sep. 17, 2019

(54) SYSTEM AND METHOD FOR EFFECTING A PHYSICAL EXPERIENCE

(71) Applicant: WEARABLE EXPERIMENTS LLC, New York, NY (US)

(72) Inventors: Benjamin James Moir, Surry Hills (AU); Billie Josephine Whitehouse, New York, NY (US)

(73) Assignee: WEARABLE EXPERIMENTS LLC, New York, NY (US)

( * ) Notice: Subject to any disclaimer, the term of this patent is extended or adjusted under 35 U.S.C. 154(b) by 0 days.

(21) Appl. No.: 15/109,562

(22) PCT Filed: Dec. 30, 2014

(86) PCT No.: PCT/US2014/072750
§ 371 (c)(1),
(2) Date: Jul. 1, 2016

(87) PCT Pub. No.: WO2015/103264
PCT Pub. Date: Jul. 9, 2015

(65) Prior Publication Data
US 2016/0325179 A1 Nov. 10, 2016

(30) Foreign Application Priority Data
Jan. 3, 2014 (AU) ............................... 2014100006

(51) Int. Cl.
A63F 13/285 (2014.01)
A63F 13/25 (2014.01)
(Continued)

(52) U.S. Cl.
CPC ............ A63F 13/285 (2014.09); A41D 1/002 (2013.01); A63F 13/25 (2014.09); A63F 13/327 (2014.09);
(Continued)

(58) Field of Classification Search
CPC ..................................................... A63F 13/285
See application file for complete search history.

(56) References Cited

U.S. PATENT DOCUMENTS 6,996,413 B2    2/2006 Inselberg
2008/0153590 A1* 6/2008 Ombrellaro ............. A63F 13/02
                                                                   463/30
(Continued)

FOREIGN PATENT DOCUMENTS

EP          1533678 A1     5/2005
WO   WO 2009/136345 A1   11/2009
(Continued)

OTHER PUBLICATIONS

International Search Report for International Patent Application PCT/US2014/072750, dated Sep. 2, 2015.
(Continued)

Primary Examiner — Omkar Deodhar
(74) Attorney, Agent, or Firm — Cooley LLP

(57) ABSTRACT

Some embodiments of the present disclosure are directed to a spectator enhancement system which may comprise a garment including one or more actuators configured to produce an effect comprising at least one of vibration, percussion, temperature, and pressure, and a first communications circuit configured for wireless communication with a first external device. The system may also include at least one of a control circuit or processor configured to control the one or more actuators and the first communications circuit, and a power source configured to supply power to at least one or more of the one or more actuators, the first communications circuit, and the control circuit. The processor may be configured to control the one or more actuators to produce the effect upon processing tactile experience information received from the first external device; and the (Continued)

effect is configured to cause tactile stimulation on the body of an individual wearing the garment.

30 Claims, 4 Drawing Sheets

(51) Int. Cl.
| | |
|---|---|
| G06F 1/16 | (2006.01) |
| G06F 3/01 | (2006.01) |
| A63F 13/332 | (2014.01) |
| A63F 13/327 | (2014.01) |
| A63F 13/335 | (2014.01) |
| A41D 1/00 | (2018.01) |
| G06F 3/16 | (2006.01) |
| H02J 7/02 | (2016.01) |
| H05K 5/00 | (2006.01) |

(52) U.S. Cl.
CPC .......... *A63F 13/332* (2014.09); *A63F 13/335* (2014.09); *G06F 1/163* (2013.01); *G06F 3/011* (2013.01); *G06F 3/16* (2013.01); *H02J 7/025* (2013.01); *H05K 5/0017* (2013.01)

(56) References Cited

U.S. PATENT DOCUMENTS

| | | |
|---|---|---|
| 2011/0251802 A1 | 10/2011 | Song |
| 2012/0293548 A1 | 11/2012 | Perez et al. |
| 2013/0166048 A1 | 6/2013 | Werner et al. |
| 2013/0321168 A1 | 12/2013 | Mahony et al. |
| 2014/0070957 A1 | 3/2014 | Longinotti-Buitoni et al. |
| 2014/0135593 A1* | 5/2014 | Jayalth ............. A61B 5/0022 600/301 |
| 2015/0359457 A1 | 12/2015 | Blumenthal et al. |

FOREIGN PATENT DOCUMENTS

| | | |
|---|---|---|
| WO | 2015060894 A1 | 4/2015 |
| WO | 2015103264 A2 | 7/2015 |

OTHER PUBLICATIONS

Anonymous: "Brain Age: Train Your Brain in Minutes a Day!—Wikipedia", Dec. 14, 2013 (Dec. 14, 2013), XP055418171, Retrieved from the Internet: URL:https://en.wikipedia.org/w/index.php?title=Brain_Age:_Train_our_Brain_in_Minutes_a_Day!& oldid=585999976 [retrieved on Oct. 23, 2017].

Anonymous: "Siri—Wikipedia", Dec. 30, 2013 (Dec. 30, 2013), XP055418174, Retrieved from the Internet: URL:https://en.wikipedia.org/w/index.php?title=Siri&oldid=588308385 [retrieved on Oct. 23, 2017].

Extended European Search Report for Application No. EP 14877066.2 dated Feb. 7, 2018, 12 pages.

International Search Report and Written Opinion for International Patent Application No. PCT/US2017/012377, dated Apr. 28, 2017.

* cited by examiner

SYSTEM AND METHOD FOR EFFECTING A PHYSICAL EXPERIENCE

RELATED APPLICATIONS

The present application claims benefit of and priority to Australian innovation patent no. 2014100006, filed Jan. 3, 2014, the entire disclosure of which is herein incorporated by reference.

BACKGROUND

During sporting events, spectators of teams or athletes participating in the events show their support by donning outfits that display their allegiance to the athlete and/or the teams. For example, fans wear jerseys, hats, jackets, etc., that display a team's and/or an athlete's insignia, numbers, colors, etc. However, while such regalia provide an indication of a spectator's allegiance and support for the team, it does not provide the spectator with any non-emotional, physical effects or experience.

SUMMARY OF SOME OF THE EMBODIMENTS

In some embodiments, a fan/spectator garment is disclosed and may comprise a garment that imparts to the user/wearer (i.e., the individual wearing the garment) sensory stimulations that are associated with activities being observed by the user/wearer. In some instances, the garment may contain control circuitry to control actuators that may be part of the garment, a wired or wireless communications circuit to communicate with a mobile device of the garment wearer, a power source to power electronics components of the garment, and/or the like.

In some embodiments, a spectator enhancement system is provided and may comprise a garment having one or more actuators configured to produce an effect comprising at least one of vibration, percussion, temperature, and pressure at and/or adjacent the one or more actuators. Further, a method for enhancing a spectator experience by providing such a garment is also provided. In such embodiments, a first communications circuit may be included configured for wireless (or wired) communication with an (first) external device, which may also be contained in the system and the garment. Examples of such an external device are a mobile device, a smartphone, a router, a server, and/or the like. For example, the (first) external device may be a mobile device configured to communicate with the processor via the first communications circuit so as to cause at least one of the one or more actuators to operate. In some instances, the garment may also comprise at least one of a control circuit or processor configured to control the one or more actuators and the first communications circuit; and a power source configured to supply power to at least one or more of the one or more actuators, the first communications circuit, and the control circuit. In addition, in some instances, the processor may be configured to control the one or more actuators to produce the effect upon processing tactile experience information received from the first external device (or a remote server/device in communication with the first external device). Further, the effect may be configured to cause tactile stimulation on the body of an individual wearing the garment.

In some embodiments, the system and the garment may further comprise an electronics housing to shelter at least the communications circuit, the control circuit and/or the source of power in the garment, an induction loop to allow wireless charging of the source of power, and/or a switch to control mode of operation of the system, where on, off, and pause are examples of said mode of operation. In some embodiments, the effect produced by one or more of the actuators may correspond to tactile experiences occurring at an event, which may be live or recorded. Examples of such an event maybe a sporting event, a television program, a movie, a concert, a show, an environment, and/or the like. The system and the garment may further comprise a participant device configured to be worn by the a participant of or at the event, the device comprising one or more sensors configured to detect tactile experiences of the participant, and a second communications circuit to communicate the tactile experience information with the first external device and/or a second external device. Examples of the second external device are a mobile device, a smartphone, a router, a server, and/or the like. For example, the second external device may comprise a mobile device configured to communicate the tactile experience information to the first external communication device. In some instances, the second external device may comprise a mobile device configured to communicate the tactile experience information to a server, where the server at least one of stores the information and communicates the information to the first communication circuit or the first external device. In some embodiments, the tactile experience information may be generated according to trigger conditions of the one or more sensors according to specifying criteria for signal generation. In some instances, the tactile experience information may be generated according to trigger conditions according to specified criteria. These specified criteria may be pre-set conditions at the server, and/or configurable using the first or second external device.

In some embodiments, the communications circuit may comprise one or more chips utilizing Wi-Fi technology, NFC technology and/or blue tooth technology. Further, the system and the garment may also comprise a speaker to provide the wearer with auditory stimulations, and/or a microphone configured to allow the individual to control the first external device via voice commands.

In some embodiments, the first signal may activate the one or more actuators to vibrate and also, for example, progressively slowdown in unison. In some embodiments, it may also cause the one or more actuators to alternatively vibrate and cease to vibrate in unison. In some instances, the one or more actuators may be located in proximity to chest, back, and/or shoulder areas of the garment, wherein the garment may cover a substantial portion of neck and/or torso of the wearer. For example, the garment is a jersey, a jacket, a scarf, a tee-shirt.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION OF SOME OF THE EMBODIMENTS

Figure 1:
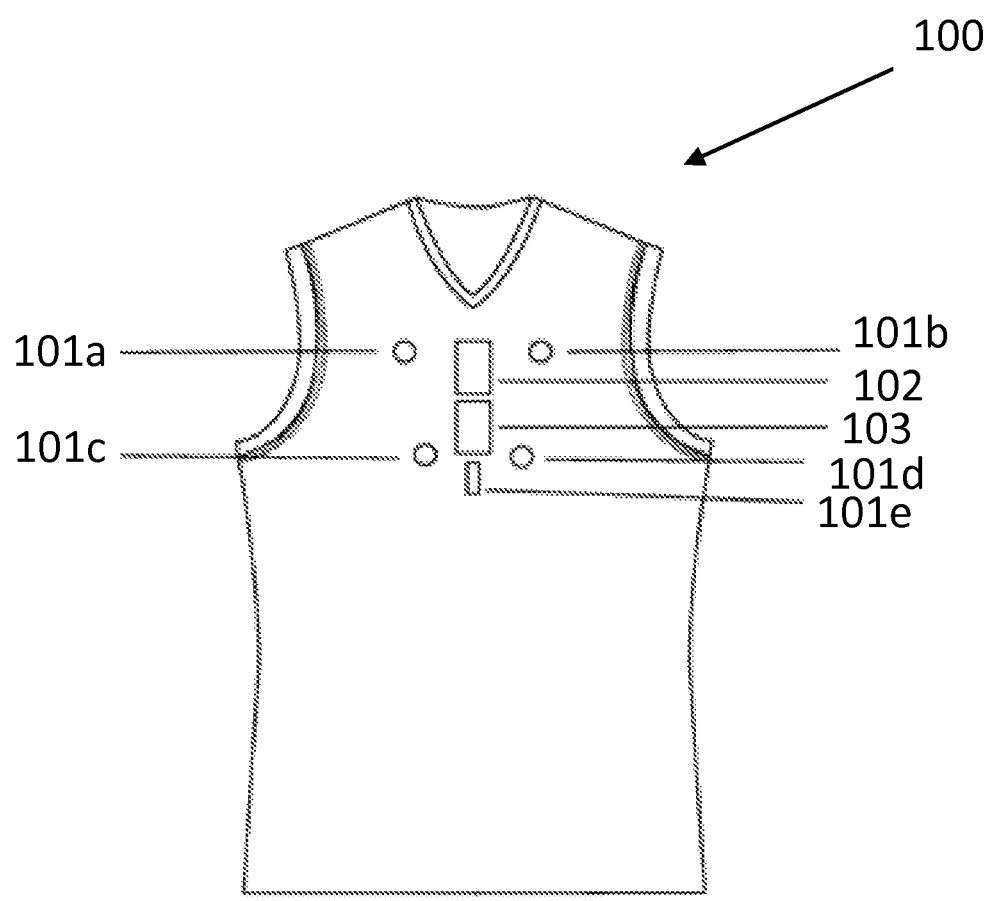
FIG. 1 shows a front view of an example embodiment of an upper body garment disclosed herein.

Fans, as well as the athletes/teams the fans support and/or are interested in, may wish to increase their level of participation by receiving some or all of the sensory stimulations that event participants receive. Accordingly, in some embodiments of the disclosure herein, the participation of spectators in a sporting event may be enhanced by a fan/spectator garment. For example, in some embodiments, the garment allows fans wearing the garments to experience activities in the sporting event such as athlete's collisions, ball contacts, motor vehicle's speed, athlete's heart rates, athlete's activities and interactions, and/or the like. In some instances, the garment may transfer touch and/or movement to the garment wearer to simulate said activities.

In some embodiments of the present disclosure, a garment 100 that imparts to the wearer sensory stimulations (which may also be referred to as haptic stimulations/experiences, physical stimulations, and the like) that are associated with activities being witnessed by the wearer is disclosed. In some instances, spectators may be witnessing sporting events such as but not limited to football games, soccer games, car races, extreme base jumps, tennis games, athletics meets, and/or the like. The term witnessing should be understood to include one or more forms of receiving information about the events such as but not limited to watching live on location, watching in absentia (e.g., broadcast television, live streaming, taped events, etc.), listening to live, taped, etc., events on location and/or in absentia, reading reports about the events (e.g., live reporting of events on media outlets and/or social, media, etc.) and/or the like. In some instances, spectators may not be witnessing the activities but may be aware of them, and the garment may impart the sensory stimulations associated with the activities. For example, spectators with disabilities that impair/impede their abilities to watch, listen to, etc., the activities may still experience the events via the sensory stimulations imparted by the garment. In some embodiments, the events may themselves be simulated, such as video games, reenactments, etc. The term "wearer" should be understood to include a person that utilizes the garment to experience the event activities, whether the garment is physically worn in the usual sense or brought into a situation that allows the user to experience the event activities (e.g., a speaker in a jersey may allow a user not wearing the jersey to experience the sounds of a game as heard by a football player on the field).

In some embodiments, data representing event activities (e.g., sports event) may be available on a server in substantially real-time, and the server may process the data to identify instances of the event activities that are candidates to be experienced by a garment wearer. Such data may be collected from the event participants (or simulated in a studio and recorded, or determined by algorithms using computer simulations of collisions/effects of an event) in a variety of ways. For example, sensors in communication with event participants and/or equipment the participants are using during the event (or equipment placed near the event), may be used to gather such data: e.g., sensors may be embedded in a player's jersey, and may measure collision impacts when a player is tackled. As another example, sensors may detect and transmit the shifts in gear and/or the speed of a car during a car race.

Data about event activities may also be gathered via sensors/devices that may not be in communication with event participants and/or equipment. For example, video and/or audio recorders may be used to obtain data on the event activities. It is to be understood that any means suited for collecting information about an event may be used for such purpose, and the data as collected by any of these means may then be transmitted to the server. In some embodiments, an algorithm may be used to process the collected data in a manner that may be used by the server for providing enhanced participation experience to spectators. In some instances, the data processing may occur at the server and/or the means used to collect the data.

Upon receiving the data, in some embodiments, the server may determine if the event is a candidate for providing spectators with enhanced participation experience, and if so which activities in the event are available for such provision. In some instances, the server may also identify and/or classify the event based on some or all of the characteristics of the event. For example, a bungee jumping competition may be identified by one of its defining characteristics, and as such be classified as an "adrenaline" event. In some instances, for example including recorded events, various moments during the event may be tagged by their defining characteristics as well. For example, a tackling moment may be identified as an "impact" moment, while an event with moments where an opposing team scores may be classified as "despair" moment. In some embodiments, the server may then provide a garment wearer with an enhanced participation experience based on trigger conditions according to some criteria.

In some embodiments, the triggers that identify the instances may be pre-set. For example, in an American football game, a trigger may identify tackles performed by a star player as activities that may be candidates to be experienced by wearers of garment disclosed herein. As another example, in car races, the driving experiences of any or selected racers when their speed exceeds a pre-set threshold may be used by the server as a trigger to identify the activity (e.g., driving) as a candidate for garment wearer experience. In some embodiments, the triggers may have been determined by the server. In some embodiments, the triggers may have been determined/selected by the garment wearer. In taped events, or in general in events where the garment wearer would like to participate in a non-live event (e.g., video games), the server may access the device hosting and availing the event to the garment wearer to access and/or process the data representing event activities.

In some embodiments, a garment wearer may have an app executing on the garment wearer's mobile device that is capable of communicating with the wireless communications circuit of the garment via any number of remote communication technologies, e.g., Wi-Fi™, NFC, Bluetooth, BLE (Bluetooth Low Energy), etc. In some instances, the app on the device and the wireless communications circuit of the garment may communicate over the internet. Further, the app may be able to communicate with one or more servers that may have access to data representing event activities. In some such embodiments, such servers may communicate with processors in the circuits in the garment via the mobile device of the garment wearer. In some embodiments, the servers may directly communicate with the processors in the garment.

In some embodiments, garment wearers may indicate on the app on their mobile devices that they wish to participate in an event of their choosing. For example, while attending a car race live on the stands, playing a football video game, watching base jumping on television, etc., a wearer may have donned a jersey, a hat, a scarf, etc., according to the disclosure herein, and may indicate on the app that the wearer wishes to participate in the event. In some embodiments, the garment wearer may indicate the type of experience s/he is looking for, and the app/server may provide recommendations to satisfy the wearer's preferences. For example, the wearer may identify adrenaline rush as the experience s/he may want to experience, and the app/server may recommend events classified as "adrenaline" events, and/or events with "adrenaline" moments for the wearer. For example, the events may be presented based on the occurrence and/or intensity of the experience they may allow the wearer to experience. For example, for "adrenaline" moments, a bungee jump event, followed by a high speed car race, followed by a soccer game, etc., may be recommended to the wearer requesting events with "adrenaline" experience. In some instances, the wearer may also indicate on the app the triggers that initiate the sensory stimulations on the garment. For example, the wearer may specify which event participant's experiences the wearer chooses to share (e.g., quarterback in a football game, driver in a car race, etc.), the conditions for participation (e.g., once the garment wearer's team is within 20 yards of the opposing goal line, the temperature is above a threshold amount, during the last quarter, etc.), and/or the like. In some instances, these triggers may already be preset at the server and/or the app. For example, when a garment wearer indicates on the app that s/he wishes to participate in an event, the app may send a request to the server identifying the event and specifying the conditions attached to the participation in the event.

An example event participation request, substantially in the form of an HTTP(S) POST message including XML-formatted data, is provided below:

```
POST /event_part_request.php HTTP/1.1
Host: www.event_simulator.com
Content-Type: Application/XML
Content-Length: 667
<?XML version = "1.0" encoding = "UTF-8"?>
<event_request>
    <timestamp>2020-12-12 15:22:43</timestamp>
    <user_name>John Doe</user_name>
    <!- user initiates session by launching app ->
    <app_name>Fan Garment App</app_name>
    <app_id>2356</app_id>
    <app_credentials>
        <public_key>sdfaj323njk3543frff</public_key>
```

-continued

```
    </app_credentials>
    <!- data/parameters related to the device user ->
    <user_data>
        <user_profile type="demographic" />
            <user_gender="male" />
            <user_age ="tier 2" /> // 35-49yo
            <user_income ="tier 3" /> // 100K-150K
        <user_profile type="behavior" />
    </user_data>
    <!- data/parameters related to device where ->
    <event_data>
        <event type="live" />
        <event_id>12dfs5f56njk</event_ID>
        <event_name> NBA_Finals_2015 </event_name>
        <participation_conditions>
            <cond_1="location" loc="2nd _court" />
            <cond_2="time" quarter="last"/>
            <cond_3="player" player_num="15" />
            ...
        </participation_conditions>
    </event_data>
//<event_data>
//    <event type="video_game" />
//    <event_id>sdfg45sgs</event_ID>
//    <event_name> F1_TOKYO </event_name>
//    <participation_conditions>
//        <cond_1="speed" speed="high" />
//        <cond_2="time" quarter="last lap"/>
//        <cond_3="driver" driver_name="jolene" />
//        ...
//    </participation_conditions>
//  </event_data>
</event_request>
```

Upon receiving the request, in some embodiments, the server may transmit to the app and/or to the garment responses based on the trigger conditions received from the app and/or the preset trigger conditions at the server. For example, the responses may comprise instructions to the app and/or processors at the garment to activate touch actuators strategically placed at the fan garment worn by the garment wearer. The following are example embodiments of an event activity, data input representing event activities to be experienced by the fan wearer, and the sensory stimulations delivered to the garment wearer by the fan garment as a result of responses/instructions issued by a server to the garment and/or to the app on the garment wearer's mobile device that is in communication with the server and/or the garment.

Data input of event activity: Racing driver changes down a gear at a V8 motor event as the car approaches a corner.
  Event to be experienced: Slowing engine revs and knock of gear change.
  Sensory stimulations: A heavy knock to all touch actuators to simulate gear changed and slowing intensity of vibrations to give sensation of car slowing down.
Data input of event activity: Football player runs the length of the field in a breakaway and scores goal.
  Event to be experienced: Physical increase in heart rate and jubilation.
  Sensory stimulations: Touch Actuators over chest beat like a heart with increasing speed. When goal scored heart beat vibration stops and all motors pulse quickly simulating excitement and jubilation.
Data input of event activity: Tennis player is serving out the final set and goes to serve an ace. Ball clips net and "let" is called by umpire.
  Event to be experienced: Tennis ball hits the net.
  Sensory stimulations: Before the umpire has even called let the spectator feels the touch actuators pulse once rapidly to give the sensation that the ball hit the net.

Data input of event activity: BASE JUMPER stands on the edge of cliff before leaping off and finally pulling chute just meters above the ground.

Event to be experienced: Heart rate increases until the moment athlete leaves the cliff when calm overcomes them before the final rush when the parachute opens.

Sensory stimulations: Touch Actuators over chest vibrate like a heart with increasing speed. Then as the athlete falls vibration starts very slow and subtle increasing in intensity simulating rushing wind on chest. Finally all touch actuators jolt as parachute opens.

Data input of event activity: 50 METRE PENALTY Your team gives away a 50 metre penalty.

Event to be experienced: Anger.

Sensory stimulations: An annoying banging on the wearer using hard rapid vibrations over and over until the kick is taken.

In some embodiments, the fan garment may have sensors that detect/measure various parameters pertaining to the fan garment and/or the wearer. In some instances, these measurements may be transmitted to the app and/or the server. For example, a sensor may measure the heart rate increase of the wearer in response to touch actuators located in proximity to the wearer's heart vibrating to simulate the excitement of a base jumper preparing to jump. In some instances, once the sensor transmits such measurements to the server and/or the app, said server/app may adjust the sensory stimulations based on the measurements. For example, the server/app may decide to cease the vibration of the actuators located on the garment if the heart beat rate of the garment wearer exceeds a threshold rate (e.g., too high for safety). In some embodiments, the sensor may be able to receive haptic feedback from the wearer of the fan garment, and transmit the feedback to the server and/or app which may then act on the feedback (e.g., increase or decrease vibration rate, etc.)

In some embodiments, there may be more than one fan garment wearers wishing to participate in an event, and synchronously or separately, wearers may participate in an event. For example, the plurality of wearers may indicate to one or more servers with data representing event activities, and indicate their wishes to participate in the event activities. In such embodiments, the servers may allow for the participation of the plurality of players in a synchronous manner. For example, four wearers wishing to participate in a doubles tennis game may each be assigned to different players. In some instances, such assignments may also be optimized based on trigger conditions that are preset and/or selected contemporaneously by the garment wearers. In some instances, the assignments may be independent of each other, and/or based on the preset or selected trigger conditions.

Figure 2A:
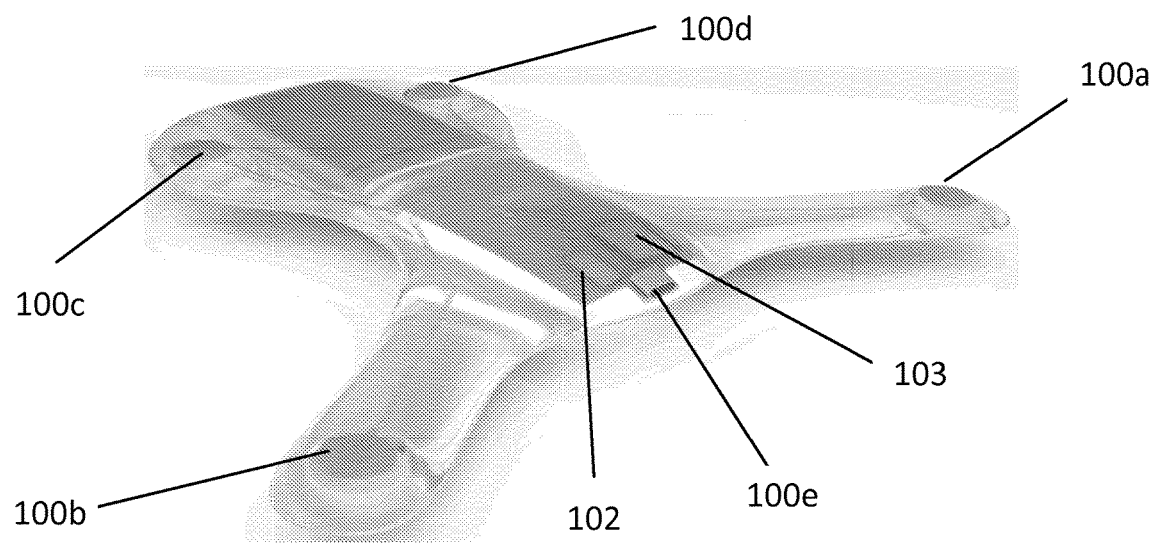
FIG. 2A-B show example pictures of an electronics housing component comprising at least a communications circuit, a control circuit, a processor, a power source, and actuators.
Figure 2B:
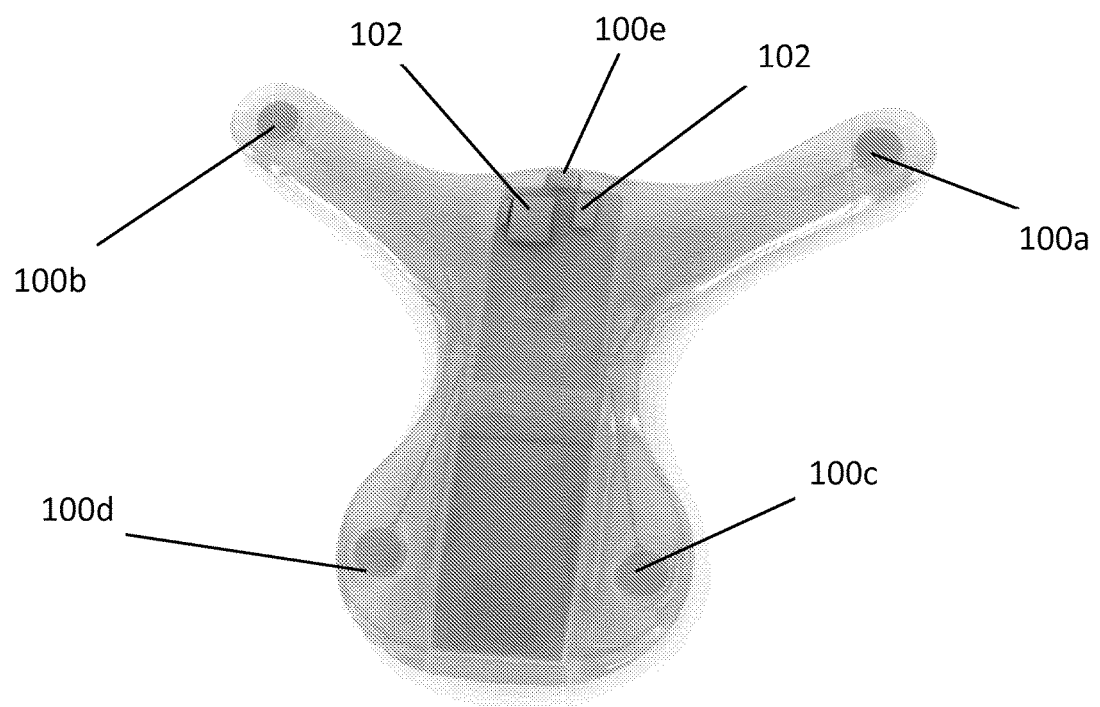

With reference to FIG. 1, in some embodiments, a front view of an upper body garment according to the disclosure herein is shown. A molded silicon housing and/or a single or multilayer laminate (e.g., tri-layer) containing some or all of the electronics components is shown located across chest and shoulders of a jersey is shown. These are represented by dashed lines as the components may not be visible to an observer (e.g. covered by clothing). Located within the jersey is a control circuit 102 connected to touch actuators 101a-101e located within the housing in the jersey. In some instances, the control circuit may be hidden from sight. Example pictures of an electronics housing component comprising at least a communications circuit, a control circuit, a processor, a power source, and actuators are shown in FIG. 2.

Figure 3:
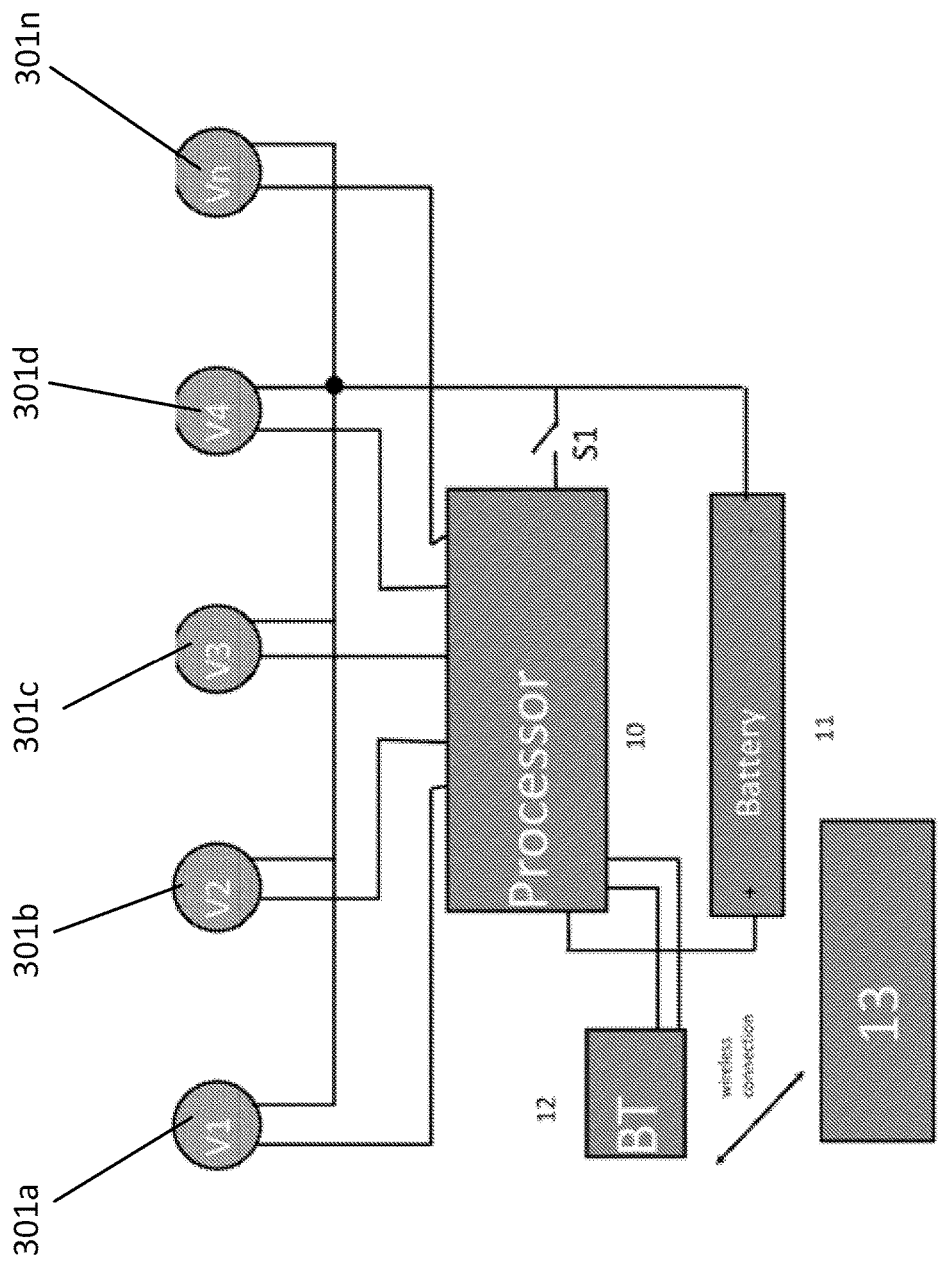
FIG. 3 illustrates a schematic circuit diagram of electronic components located within the garment.

With reference to FIG. 3, in some embodiments, an example control circuit of a fan garment comprising electronics components is disclosed. In some embodiments, the control circuit comprise a processor connected to a power source 11 (e.g., battery), a wireless communications chip 12 (e.g., a blue tooth chip, NFC chip, Wi-Fi module, etc.), and a switch S1 connected to the processor 10 to provide an on/off switch and/or a mode control switch. The wireless communications chip may be in communication to a mobile device 13 of the fan garment wearer. In some instances, one or more actuators V1 301a, V2 301b, V3 301c, . . . , Vn 301n may be connected (e.g., directly) to the processor 10. In some instances, the processor 10 may be an ARDUINO processor (for example) and contains built-in logic to control the haptic feedback to the wearer inherent in the variable number of touch actuators V1 301a, . . . , Vn 301n.

In some embodiments, the fan garment wearer may utilize an application that is executed on a mobile device to communicate with the fan garment and/or the server with the data representing the event activities. For example, custom application loaded into the smart phone 13 may connect to a server via the internet to receive broadcast events relevant to the team or athlete the wearer is choosing to follow. Under the control of the smart phone 13, the control circuit may operate as a peripheral device. In some embodiments, for the fan garment wearer to feel an event, the custom application may signal via the wireless communications chip 12 to the processor 10 a set of vibrations to be transmitted to the wearer. The processor 10 may then activate the corresponding touch actuators accordingly. As an example, touch Actuators V1 301a-Vn 301n can pulse rapidly in unison, or two touch actuators can turn on and off in rhythm to signal a heart beat. In some embodiments, the fan garment may also possess the capability to produce sensory stimulations in addition, or instead of, tactile stimulations. For example, the fan garment may produce auditory stimulations. For example, a microphone in the jersey may allow the wearer to make use of voice-enabled features of the smart phone. Similarly, a speaker in the jersey can provide the spectator with commentary of a specific event. In some embodiments, the fan garment may comprise an induction loop to allow for wireless charging of the battery.

Figure 4A:
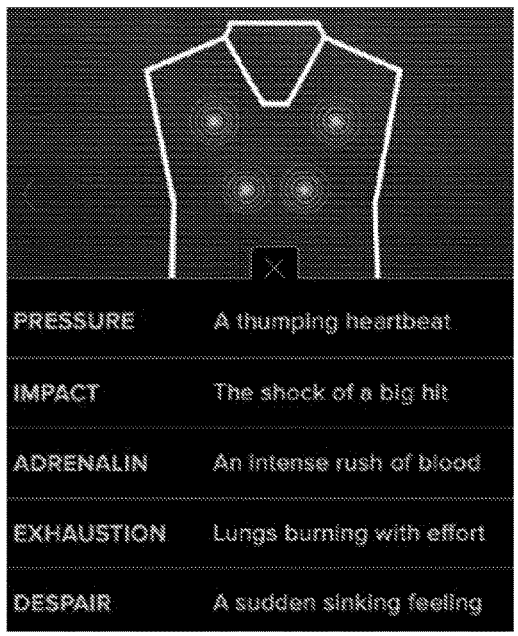
FIGS. 4A-C show example screenshots of an app executing on a garment wearer's device for communicating with a server and/or the garment to indicate and/or control experience enhancement preferences.
Figure 4C:
Figure 4B:
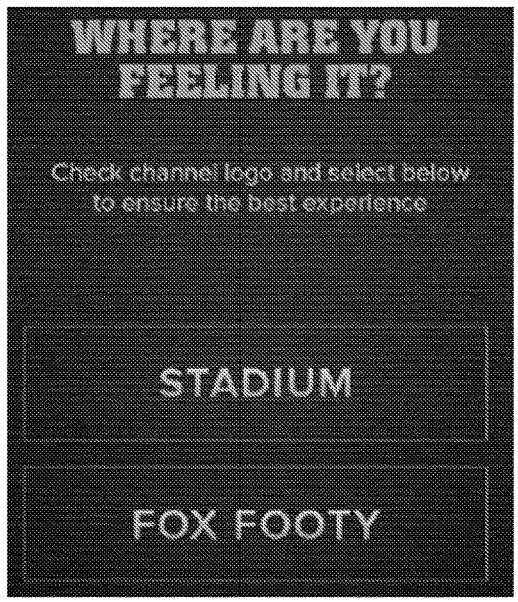

FIGS. 4A-C illustrate example screenshots of an app, according to some embodiments, executed on a garment wearer's mobile (e.g.) device for communicating with a server and/or the garment to indicate and/or control experience enhancement preferences are shown. For example, FIG. 4A shows five types of experience options presented to a garment wearer to choose. For example, the server and/or the app may allow the wearer to choose experiences that impart to the wearer one or more of the sensory stimulations pressure, impact, adrenalin, exhaustion and despair. Once the wearer chooses the kind of experience s/he prefers, in some embodiments, event activities that comprise those experience may be presented to the wearer. In some instances, the app may further inquire for other pertinent information before availing one or more events for the user to select for experiencing. For example, the app may request for the location of the wearer and/or where the wearer would like to experience an event, as shown with reference to FIG. 4B.

As another example, the app may request the wearer to confirm the preferred time for experiencing an event. Upon the selection of an event, in some embodiments, the garment may deliver the selected experiences to the wearer according to the event and based on any trigger conditions that may have been pre-set or determined by the wearer. For example, if the sensory experience chosen was "impact" and the wearer has indicated on the app that the wearer is at a football stadium, the server may select an athlete (or a position, e.g., quarterback, etc.) on the field likely to experience an "impact" during a game to allow the wearer to share in the experience of the athlete. In some instances, the athlete may be wearing sensors that detect and transmit to the server the tactile experiences (including impact in this example) of the athlete. In some instances, the data may be obtained and transmitted to the server in other means. For example, an algorithm may process a video feed of the athlete's movements and recreate the experience to transfer to the server. In yet some embodiments, the experiences of the athlete may be entirely or partially simulated (e.g., video games).

In some embodiments, the moments in the chosen event activities are selected based on the trigger conditions based on some criteria. In the above example, the garment wearer may wish to experience the "impact" an event participant, such as an athlete in a football game (e.g., quarterback), experiences only when the score shows the game is competitive. As such, the criteria may specify that impacts to the wearer's chosen participant would not be made available to the wearer if the difference in scores between the opposing teams exceeds some predetermined threshold.

With reference to FIG. 4C, in some embodiments, the wearer may select events without specifying the types of experiences that the wearer prefers to experience. For example, the wearer may indicate to the app that he is at a boxing match on a particular time and would like to see if events are available to be experienced. Once the user experiences an event as described above without specifying the nature of experience preferred (e.g., garment wearer chooses to share in the experience of his/her favorite boxer fighting at that moment), in some instances, the server/app may present to the wearer scores indicating a breakdown of event experiences that wearer had.

Communication between various components, including a processor which includes computer instructions operable thereon which are configured to at least one of control the disclosed devices and systems, can be wired communication, and/or wireless via an analog short range communication mode, or a digital communication mode including, for example, WI-FI or BLUETOOTH®. Additional examples of such communication can include communication across a network. Such a network can include a local area network ("LAN"), a wide area network ("WAN"), or a global network, for example. The network can be part of, and/or can include any suitable networking system, such as the Internet, for example, and/or an Intranet.

Generally, the term "Internet" may refer to the worldwide collection of networks, gateways, routers, and computers that use Transmission Control Protocol/Internet Protocol ("TCP/IP") and/or other packet based protocols to communicate therebetween.

In some embodiments, the disclosed systems and devices may comprise one or more transmission elements for communication between components thereof. In some embodiments, the transmission element can include at least one of the following: a wireless transponder, or a radio-frequency identification ("RFID") device. The transmission element can include at least one of the following, for example: a transmitter, a transponder, an antenna, a transducer, and/or an RLC circuit or any suitable components for detecting, processing, storing and/or transmitting a signal, such as electrical circuitry, an analog-to digital ("A/D") converter, and/or an electrical circuit for analog or digital short range communication.

In some embodiments, a controller/processor according to some embodiments and/or any other relevant component of disclosed devices and systems can include a memory, a storage device, and an input/output device. Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof (e.g., the disclosed processor/controllers). These various implementations, such as associated with the disclosed devices/systems and the components thereof, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., nontransitory mediums including, for example, magnetic discs, optical disks, flash memory, Programmable Logic Devices (PLDs)) used to provide machine instructions and/or data to a programmable controller/processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device which includes a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smartphone, media player or personal data assistant ("PDA"). Other kinds of devices may be used to provide for interaction with a user as well.

For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented on a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with features and claims supported by the present disclosure and their equivalents. Moreover, embodiments of the subject disclosure may include methods, systems and devices which may further include any and all elements/features from any other disclosed methods, systems, and devices, including any and all features corresponding to user-experience functionality/systems/methods, including the manufacture and use thereof. In other words, features from one and/or another disclosed embodiment may be interchangeable with features from other disclosed embodiments, which, in turn, correspond to yet other embodiments. One or more features/elements of disclosed embodiments may be removed and still result in patentable subject matter (and thus, resulting in yet more embodiments of the subject disclosure). Furthermore, some embodiments of the present disclosure may be distinguishable from the prior art by specifically lacking one and/or another feature, functionality or structure which is included in the prior art (i.e., claims directed to such embodiments may include "negative limitations").

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is currently claimed is:

1. A spectator enhancement system comprising:
 a garment including:
  one or more actuators configured to produce an effect comprising at least one of vibration, percussion, temperature, and pressure at and/or adjacent the one or more actuators;
  a first communications circuit;
  at least one of a control circuit or processor configured to control the one or more actuators and the first communications circuit; and
  a power source configured to supply power to at least one or more of the one or more actuators, the first communications circuit, and the control circuit,
 a first external device having an user interface and instructions operating thereon configured for at least causing the first external device:
  to communicate with the control circuit and/or processor via the first communications circuit, and a participant device and/or a remote device, and
  to display via the user interface a user selectable list of triggering criteria configured to cause a wearer of the garment to experience the effect including:
   types of sensory experiences to be experienced by the wearer,
   types of events to be experienced by the wearer;
   a geographic location of the wearer and/or a type of venue where the wearer desires to experience;
   and/or a time the wearer desires to experience an event.

2. The system of claim 1, wherein the first external device is selected from the group consisting of a mobile device, a smartphone, a router, and a server.

3. The system of claim 1, wherein the garment further comprises a housing configured to house at least one of the first communications circuit, the control circuit, the processor and the power source.

4. The system of claim 1, wherein the garment further comprises an induction loop configured for wireless charging of the power source.

5. The system of claim 1, wherein the garment further comprises at least one switch to control a mode of operation of the garment.

6. The system of claim 5, wherein the mode of operation comprises on, off, and pause.

7. The system of claim 1, wherein the types of events include two or more of: a sporting event, a television program, a movie, a concert, a show, and an environment.

8. The system of claim 1, wherein the event is live or recorded.

9. The system of claim 1, wherein the first communications circuit is configured to operate according to at least one of Wi-Fi technology, NFC technology and/or blue tooth technology.

10. The system of claim 1, further comprising a speaker to provide the wearer with auditory stimulations.

11. The system of claim 1, further comprising a microphone configured to allow the individual to control the first external device via voice commands.

12. The system of claim 1, wherein the one or more actuators comprise a plurality of actuators and where the processor controls the plurality of actuators to vibrate and progressively slow down in unison.

13. The system of claim 1, wherein the one or more actuators comprise a plurality of actuators and where the processor controls the plurality of actuators to alternatively vibrate and cease in unison.

14. The system of claim 1, wherein the one or more actuators are arranged in proximity to the chest, back, and/or shoulder areas of the garment.

15. The system of claim 1, wherein the garment covers a substantial portion of neck and/or torso of the individual.

16. The system of claim 1, wherein the garment comprises a jersey, a jacket, a scarf, or a Tee-shirt.

17. A method for enhancing a spectator experience comprising: providing the system of claim 1;
processing tactile communication information received from the first external device; and
controlling the one or more actuators to produce the effect based on the processed tactile experience information, wherein the effect is configured to cause tactile stimulation on the body of an individual wearing the garment.

18. The method of claim 17, wherein the effect corresponds to tactile experiences occurring at an event.

19. The method of claim 17, further comprising communicating the tactile experience information to the first communications circuit or processor from the first external device.

20. The method of claim 17, further comprising detecting tactile experiences of a participant of an event, and communicating the tactile experience information to the first external device and/or a second external device.

21. The method of claim 17, wherein the types of events include two or more of: a sporting event, a television program, a movie, a concert, a show, and an environment.

22. The method of claim 17, wherein the event is live or recorded.

23. The method of claim 17, further comprising controlling the actuators to vibrate and progressively slowdown in unison.

24. The method of claim 17, further comprising controlling the actuators to alternatively vibrate and cease in unison.

25. The system of claim 1, wherein the list of user selectable experiences includes at least two or more of pressure, impact, adrenalin, exhaustion and despair.

26. The method of claim 17, wherein the list of user selectable experiences includes at least two or more of pressure, impact, adrenalin, exhaustion and despair.

27. The system of claim 1, wherein the user selectable list of triggering criteria configured to cause a wearer of the garment to experience the effect include at least two of:
the types of sensory experiences to be experienced by the wearer,
the types of events to be experienced by the wearer;
a geographic location of the wearer and/or a type of venue where the wearer desires to experience; and
a time the wearer desires to experience an event.

28. The system of claim 1, wherein the user selectable list of triggering criteria configured to cause a wearer of the garment to experience the effect include all of:
the types of sensory experiences to be experienced by the wearer,
the types of events to be experienced by the wearer;
a geographic location of the wearer and/or a type of venue where the wearer desires to experience; and
a time the wearer desires to experience an event.

29. The method of claim 17, wherein the user selectable list of triggering criteria configured to cause a wearer of the garment to experience the effect include at least two of:
the types of sensory experiences to be experienced by the wearer,
the types of events to be experienced by the wearer;
a geographic location of the wearer and/or a type of venue where the wearer desires to experience; and
a time the wearer desires to experience an event.

30. The method of claim 17, wherein the user selectable list of triggering criteria configured to cause a wearer of the garment to experience the effect include all of:
the types of sensory experiences to be experienced by the wearer,
the types of events to be experienced by the wearer;
a geographic location of the wearer and/or a type of venue where the wearer desires to experience; and
a time the wearer desires to experience an event.

* * * * *